US010415701B2

(12) United States Patent
Chimbe et al.

(10) Patent No.: US 10,415,701 B2
(45) Date of Patent: Sep. 17, 2019

(54) CONTROL DEVICE FOR VEHICLE, AND CONTROL METHOD FOR VEHICLE

(71) Applicant: TOYOTA JIDOSHA KABUSHIKI KAISHA, Toyota-shi, Aichi-ken (JP)

(72) Inventors: Tomohiro Chimbe, Kariya (JP); Norihiro Tsukamoto, Toyota (JP); Keisuke Ota, Toyota (JP); Tomohiro Asami, Nisshin (JP); Hiromasa Takai, Anjo (JP); Daiki Fukuda, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 254 days.

(21) Appl. No.: 15/658,708

(22) Filed: Jul. 25, 2017

(65) Prior Publication Data
US 2018/0031125 A1   Feb. 1, 2018

(51) Int. Cl.
*F16H 61/686* (2006.01)
*F16H 61/00* (2006.01)
(Continued)

(52) U.S. Cl.
CPC ....... *F16H 61/686* (2013.01); *F16H 61/0021* (2013.01); *F16H 61/0213* (2013.01); *F16H 61/0437* (2013.01); *F16H 61/08* (2013.01); *F16H 3/666* (2013.01); *F16H 59/14* (2013.01); *F16H 59/42* (2013.01); *F16H 59/72* (2013.01); *F16H 2059/148* (2013.01); *F16H 2059/385* (2013.01); *F16H 2061/0492* (2013.01); *F16H 2200/006* (2013.01); *F16H 2200/201* (2013.01); *F16H 2200/2046* (2013.01); *F16H 2200/2097* (2013.01); *F16H 2306/44* (2013.01)

(58) Field of Classification Search
CPC ......... F16H 2059/148; F16H 2059/385; F16H 61/0213; F16H 59/14; F16H 59/42; F16H 59/425; F16H 59/44; F16H 61/002; F16H 61/043; F16H 61/08; F16H 61/68; F16H 61/686; F16H 2061/0492; F16H 2306/044
See application file for complete search history.

(56) References Cited

U.S. PATENT DOCUMENTS

| 6,010,428 A | 1/2000 | Hoshiya et al. |
| 2003/0233185 A1* | 12/2003 | Takebayashi ......... F16H 61/061 701/55 |

(Continued)

FOREIGN PATENT DOCUMENTS

| CN | 104919225 A | 9/2015 |
| JP | H11-13869 A | 1/1999 |

*Primary Examiner* — Jacob S. Scott
*Assistant Examiner* — Lori Wu
(74) *Attorney, Agent, or Firm* — Oliff PLC

(57) ABSTRACT

An electronic control unit is configured to control a hydraulic pressures of engaging element and disengaging element in accordance with a preset target output shaft torque during a power-on downshift. The electronic control unit is configured to delay a start of decrease in the hydraulic pressure of the disengaging element from a start of a torque phase while maintain the hydraulic pressure of the disengaging element at the start of the torque phase. The electronic control unit is configured to start decreasing the hydraulic pressure of the disengaging element when the electronic control unit determines that overspeed of an input shaft is occurring during the torque phase and a predetermined condition is established.

5 Claims, 8 Drawing Sheets

(51) Int. Cl.
*F16H 61/02* (2006.01)
*F16H 61/08* (2006.01)
*F16H 61/04* (2006.01)
F16H 3/66 (2006.01)
F16H 59/42 (2006.01)
F16H 59/14 (2006.01)
F16H 59/72 (2006.01)
F16H 59/38 (2006.01)

(56) References Cited

U.S. PATENT DOCUMENTS

2011/0106355 A1* 5/2011 Tsuda .................. B60W 10/02
701/22
2015/0369359 A1 12/2015 Tsutsui et al.
2017/0050640 A1* 2/2017 Toyokawa ............ F16H 61/061

* cited by examiner

FIG. 3

|     | C1 | C2 | C3 | C4 | B1 | B2 |
|-----|----|----|----|----|----|----|
| 1st | O  |    |    |    |    | O  |
| 2nd | O  |    |    |    | O  |    |
| 3rd | O  |    | O  |    |    |    |
| 4th | O  |    |    | O  |    |    |
| 5th | O  | O  |    |    |    |    |
| 6th |    | O  |    | O  |    |    |
| 7th |    | O  | O  |    |    |    |
| 8th |    | O  |    |    | O  |    |
| Rev |    |    | O  |    |    | O  |

CONTROL DEVICE FOR VEHICLE, AND CONTROL METHOD FOR VEHICLE

INCORPORATION BY REFERENCE

The disclosure of Japanese Patent Application No. 2016-148178 filed on Jul. 28, 2016 including the specification, drawings and abstract is incorporated herein by reference in its entirety.

BACKGROUND

1. Technical Field

The disclosure relates to a control device for a vehicle including an engine and an automatic transmission that transmits power from the engine to a drive wheel side, and control method for a vehicle.

2. Description of Related Art

Various techniques for relieving a shift shock through control over hydraulic pressure have been suggested conventionally for an automatic transmission that establishes a plurality of gear positions having different speed ratios by selectively engaging or releasing a plurality of engagement elements (for example, clutches) through hydraulic pressure control.

For example, Japanese Patent Application Publication No. 11-013869 (JP 11-013869 A) suggests the following configuration. When a clutch-to-clutch downshift command is issued in a power-on state, a high-speed gear clutch hydraulic pressure is decreased. When the start of increase in the input rotation speed of a transmission is detected accordingly, the high-speed gear clutch hydraulic pressure is subjected to feedback control such that the rate of increase in input rotation speed becomes a predetermined value. After it is detected that the input rotation speed becomes a rotation speed close to a low-speed gear synchronous rotation speed, a low-speed gear clutch hydraulic pressure is gradually increased, and the high-speed gear clutch hydraulic pressure is decreased while being subjected to feedback control on the basis of the input rotation speed.

With the configuration described in JP 11-013869 A, since the high-speed gear clutch hydraulic pressure is subjected to feedback control while the input rotation speed is monitored, it is possible to smoothly change hydraulic pressure. Thus, even when there are variations (machine difference) of clutches, it is possible to relieve a shift shock.

SUMMARY

However, a technique for executing feedback control over high-speed gear (releasing) clutch hydraulic pressure while monitoring the input rotation speed of the transmission as in the case of JP 11-013869 A has the following inconvenience.

That is, when a change of the engaged clutch cannot be achieved along a target pressure due to the influence of a delay in the response of actual pressure of low-speed gear (engaging) clutch hydraulic pressure to a command hydraulic pressure or a machine difference of the clutch in the last stage (torque phase) of a power-on downshift, overspeed of a turbine rotation speed (so-called turbine overspeed) can occur. If such turbine overspeed occurs, an inertia shock can occur as a result of decreasing the turbine rotation speed by the engaging clutch hydraulic pressure after output shaft torque drops due to a decrease in the releasing clutch hydraulic pressure. In order to suppress turbine overspeed while suppressing occurrence of such an inertia shock, the releasing clutch hydraulic pressure needs to take charge of inertia that decreases the turbine rotation speed. Therefore, with the configuration described in JP 11-013869 A, the releasing clutch hydraulic pressure is increased through feedback control. Increasing the releasing clutch hydraulic pressure is effective in reducing turbine overspeed; however, a releasing clutch has an excessive torque capacity, so there is an inconvenience that a shock due to tie-up increases or an inconvenience that the durability of the releasing clutch decreases due to an increase in friction material load as the actual response of the engaging clutch hydraulic pressure catches up and engaging force increases.

The disclosure provides a technique for, even when there occurs a delay in the response of an engaging engagement element, or the like, in power-on downshift, suppressing an increase in shock due to tie-up or an increase in the friction material load of each engagement element while suppressing turbine overspeed.

A control device for a vehicle according to an aspect of the disclosure is configured to delay a start of decrease in engagement hydraulic pressure of a releasing engagement element from a start of a torque phase in consideration of the influence of a delay in response of an engaging engagement element and a machine difference.

Specifically, a first aspect of the disclosure provides a control device for a vehicle. The vehicle includes an engine, an automatic transmission and an electronic control unit. The automatic transmission includes an input shaft and a plurality of engagement elements. The plurality of engagement elements includes an engaging element and a disengaging element. The automatic transmission is configured to establish a plurality of gear positions having different speed ratios by selectively engaging and disengaging the plurality of engagement elements through hydraulic pressure control and is configured to transmit power from the engine to a drive wheel side. The electronic control unit is configured to control a hydraulic pressure of the engaging element and a hydraulic pressure of the disengaging element in accordance with a preset target output shaft torque, during a power-on downshift. The electronic control unit is configured to delay a start of decrease in the hydraulic pressure of the disengaging element from a start of a torque phase while maintaining the hydraulic pressure of the disengaging element at the start of the torque phase. The electronic control unit is configured to start decreasing the hydraulic pressure of the disengaging element when the electronic control unit determines that overspeed of the input shaft is occurring during the torque phase and a predetermined condition is established. The predetermined condition is one of a condition in which a delay time from the start of the torque phase exceeds a predetermined upper limit delay time and a condition in which the overspeed has converged within the upper limit delay time.

In the aspect of the disclosure, "power-on" means a vehicle state where power is transmitted from the engine to the drive wheel side. In many cases, this vehicle state coincides with a state where an accelerator is being depressed.

In the aspect of the disclosure, "torque phase" means a state after a differential rotation speed between an input shaft rotation speed after shifting and a current input shaft rotation speed in the automatic transmission falls within a predetermined range and, as a result, an inertia phase ends. The "torque phase" does not always mean only a state where an output shaft torque is actually varying. For this reason, "a start of a torque phase" may be translated into "when a differential rotation speed between an input shaft rotation speed after shifting and a current input shaft rotation speed in the automatic transmission falls within a predetermined range and, as a result, an inertia phase ends". "In the torque phase" may be translated into "in a state where a differential rotation speed between an input shaft rotation speed after shifting and a current input shaft rotation speed in the automatic transmission falls within a predetermined range and, as a result, an inertia phase ends".

With this configuration, for example, even when overspeed of the input shaft rotation speed occurs in the torque phase due to a delay in the response of the engaging engagement element, or the like, the engagement hydraulic pressure of the releasing engagement element is not increased, but the start of decrease in the engagement hydraulic pressure is delayed from the start of the torque phase while the engagement hydraulic pressure of the releasing engagement element at the start of the torque phase is maintained. Therefore, it is possible to make it difficult for overspeed of the input shaft rotation speed to occur. Since the releasing engagement element does not have an excessive torque capacity, it is possible to suppress an increase in shock due to tie-up.

When overspeed of the input shaft rotation speed is occurring in the torque phase, and when a decrease in the engagement hydraulic pressure of the releasing engagement element, which has been delayed, is started at the time when the overspeed has converged, it is possible to reliably suppress overspeed of the input shaft rotation speed.

On the other hand, when overspeed of the input shaft rotation speed is occurring in the torque phase, and when a decrease in the engagement hydraulic pressure of the releasing engagement element, which has been delayed, is started at the time when the delay time exceeds the upper limit delay time even before the overspeed converges, it is possible to prevent, for example, clutch burning, or the like, by suppressing an increase in the friction material load of the releasing engagement element. Thus, it is possible to suppress a decrease in the durability of the releasing engagement element.

In the control device for the vehicle, the electronic control unit may be configured to decrease the hydraulic pressure of the disengaging element in accordance with the target output shaft torque, when the electronic control unit determines that the predetermined condition is established.

With this configuration, since the engagement hydraulic pressure of the releasing engagement element of which a state at the start of the torque phase is maintained is decreased in accordance with the target output shaft torque, it is possible to achieve an intended change in the target output shaft torque after a lapse of the upper limit delay time or after convergence of the overspeed even when there occurs unexpected overspeed, or the like. Thus, it is possible to reliably reduce a shift shock.

In the control device for the vehicle, the electronic control unit may be configured to start decreasing the hydraulic pressure of the disengaging element when the electronic control unit determines that overspeed of the input shaft is not occurring in the torque phase and the delay time becomes longer than or equal to a minimum delay time. The minimum delay time may be set so as to be shorter than the upper limit delay time.

With this configuration, since the start of decrease in the engagement hydraulic pressure of the releasing engagement element is delayed until a lapse of the minimum delay time even when overspeed of the input shaft rotation speed is not occurring in the torque phase, it is possible to prevent the overspeed of the input shaft rotation speed due to the influence of, for example, a delay in response of the engagement hydraulic pressure of the engaging engagement element or a machine difference of the engaging engagement element.

In the control device for the vehicle, the minimum delay time may be set based on an assigned torque of the engaging element and an oil temperature of the automatic transmission.

With this configuration, since the minimum delay time is set in response to a real target engaging engagement element, it is possible to further reliably suppress overspeed of the input shaft rotation speed.

A second aspect of the disclosure provides a control method for vehicle. The vehicle includes an engine, an automatic transmission, and an electronic control unit. The automatic transmission includes an input shaft and a plurality of engagement elements. The plurality of engagement elements includes an engaging element and a disengaging element. The automatic transmission is configured to establish a plurality of gear positions having different speed ratios by selectively engaging and disengaging the plurality of engagement elements through hydraulic pressure control and is configured to transmit power from the engine to a drive wheel side. The control method comprising: controlling, by the electronic control unit, a hydraulic pressure of the engaging element and a hydraulic pressure of the disengaging element in accordance with a preset target output shaft torque during a power-on downshift; delaying, by the electronic control unit, a start of decrease in the hydraulic pressure of the disengaging element from a start of a torque phase while maintaining the hydraulic pressure of the disengaging element at the start of the torque phase; and starting, by the electronic control unit, decreasing the hydraulic pressure of the disengaging element when the electronic control unit determines that overspeed of the input shaft is occurring during the torque phase and a predetermined condition is established. The predetermined condition is a condition in which one of a delay time from the start of the torque phase exceeds a predetermined upper limit delay time and a condition in which the overspeed has converged within the upper limit delay time.

With this configuration, even when there occurs, for example, a delay in the response of the engaging engagement element in a power-on downshift, it is possible to suppress an increase in shock due to tie-up while suppressing turbine overspeed, so it is possible to suppress a decrease in the durability of each engagement element by suppressing an increase in the friction material load of each engagement element.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is an operation chart that shows the engagement statuses of first to fourth clutches and first and second brakes in each speed position in the automatic transmission;

DETAILED DESCRIPTION OF EMBODIMENTS

Hereinafter, an embodiment of the disclosure will be described with reference to the accompanying drawings.

Initially, a vehicle 100 according to the present embodiment will be described with reference to FIG. 1 to FIG. 4.

Figure 1:
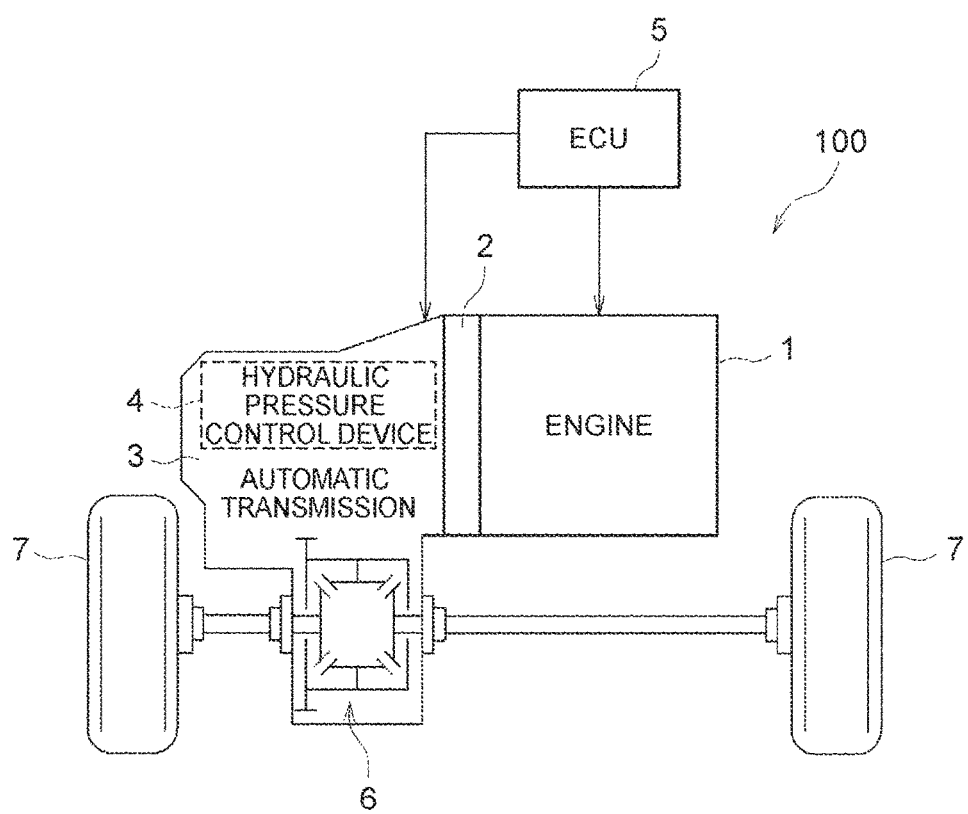
FIG. 1 is a view that shows the schematic configuration of a vehicle according to an embodiment of the disclosure.

As shown in FIG. 1, the vehicle 100 includes an engine 1, a torque converter 2, an automatic transmission 3, a hydraulic pressure control device 4 and an electronic control unit (ECU) 5. The vehicle 100 is of, for example, a front-engine front-drive (FF) type. The output of the engine 1 is transmitted to a differential unit 6 via the torque converter 2 and the automatic transmission 3, and is then distributed to right and left drive wheels (front wheels) 7.

The engine 1 is a driving force source for propelling the vehicle 100, and is, for example, a multi-cylinder gasoline engine. The engine 1 is configured such that the operation status is controllable through a throttle opening degree (intake air amount) of a throttle valve, a fuel injection amount, ignition timing, and the like.

Figure 2:
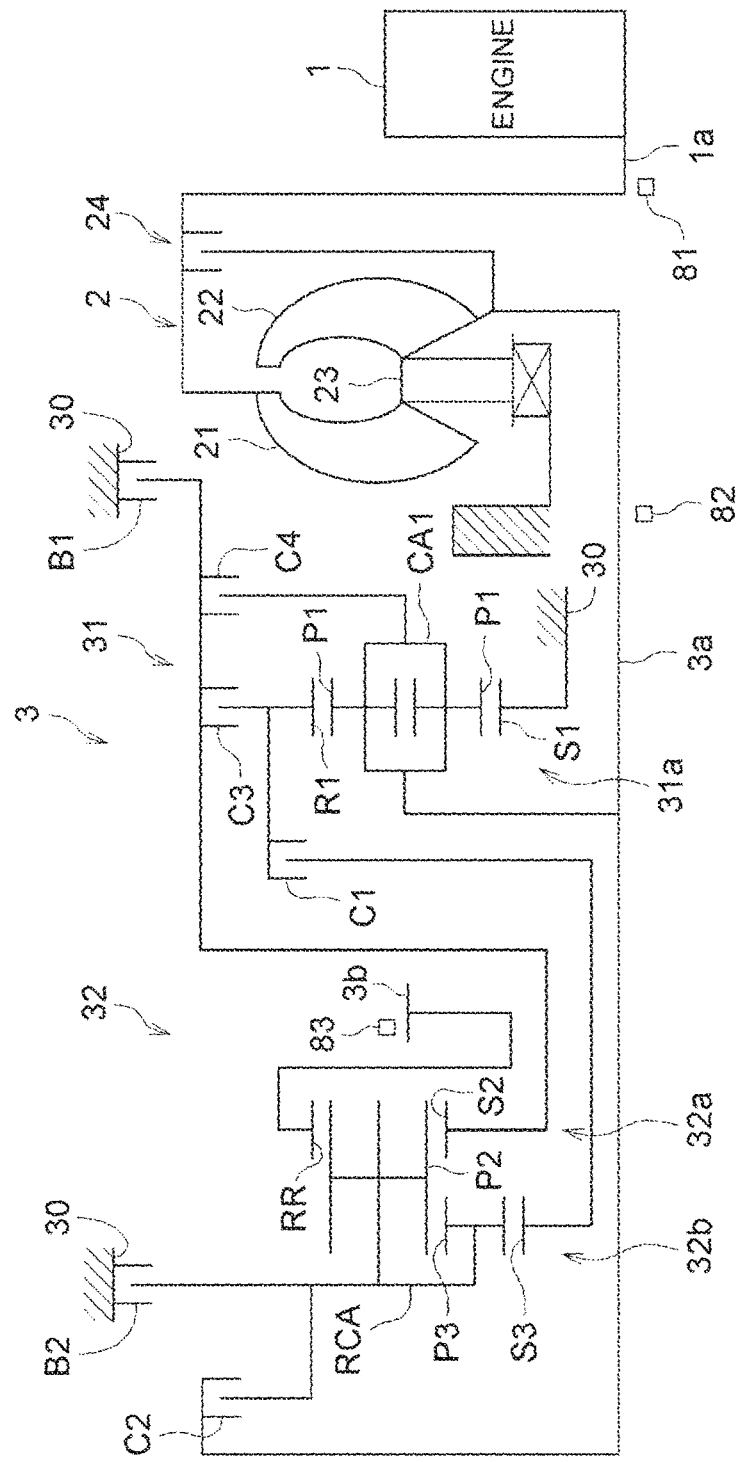
FIG. 2 is a skeletal view that shows the configuration of a torque converter and automatic transmission.

As shown in FIG. 2, the torque converter 2 includes a pump impeller 21, a turbine runner 22, a stator 23 and a lockup clutch 24. The pump impeller 21 is coupled to a crankshaft 1a that is the output shaft of the engine 1. The turbine runner 22 is coupled to the automatic transmission 3. The stator 23 has a torque amplification function. The lockup clutch 24 is used to directly couple the engine 1 to the automatic transmission 3. FIG. 2 schematically shows only the upper half of the torque converter 2 and automatic transmission 3 and does not show the lower half of the torque converter 2 and automatic transmission 3 with respect to the rotation central axes of the torque converter 2 and automatic transmission 3.

The automatic transmission 3 is provided in the power transmission path between the engine 1 and the drive wheels 7. The automatic transmission 3 is configured to change the speed of rotation of an input shaft 3a and then output the rotation to an output shaft 3b. The input shaft 3a of the automatic transmission 3 is coupled to the turbine runner 22 of the torque converter 2. The output shaft 3b of the automatic transmission 3 is coupled to the drive wheels 7 via the differential unit 6, and the like.

The automatic transmission 3 includes a first transmission unit (front planetary unit) 31, a second transmission unit (rear planetary unit) 32, first to fourth clutches C1 to C4, a first brake B 1, a second brake B2, and the like. The first transmission unit 31 is mainly constituted of a first planetary gear 31a. The second transmission unit 32 is mainly constituted of a second planetary gear 32a and a third planetary gear 32b.

The first planetary gear 31a that constitutes the first transmission unit 31 is a double pinion planetary gear set. The first planetary gear 31a includes a sun gear S1, a plurality of pairs of mutually meshing pinion gears P1, a planetary carrier CA1 and a ring gear R1. The planetary carrier CA1 supports the pinion gears P1 such that each of the pinion gears P1 is rotatable and revolvable. The ring gear R1 is in mesh with the sun gear S1 via the pinion gears P1.

The planetary carrier CA1 is coupled to the input shaft 3a, and rotates integrally with the input shaft 3a. The sun gear S1 is fixed to a transmission case 30, and is non-rotatable. The ring gear R1 functions as an intermediate output member. The ring gear R1 reduces the speed of rotation from the input shaft 3a and then transmits the rotation reduced in speed to the second transmission unit 32.

The second planetary gear 32a that constitutes the second transmission unit 32 is a single pinion planetary gear set. The second planetary gear 32a includes a sun gear S2, pinion gears P2, a planetary carrier RCA and a ring gear RR. The planetary carrier RCA supports the pinion gears P2 such that each of the pinion gears P2 is rotatable and revolvable. The ring gear RR is in mesh with the sun gear S2 via the pinion gears P2.

The third planetary gear 32b that constitutes the second transmission unit 32 is a double pinion planetary gear set. The third planetary gear 32b includes a sun gear S3, a plurality of pairs of mutually meshing pinion gears P2, P3, the planetary carrier RCA and the ring gear RR. The planetary carrier RCA supports the pinion gears P2, P3 such that each of the pinion gears P2, P3 is rotatable and revolvable. The ring gear RR is in mesh with the sun gear S3 via the pinion gears P2, P3. The pinion gears P2, the planetary carrier RCA and the ring gear RR are shared between the second planetary gear 32a and the third planetary gear 32b.

The sun gear S2 is selectively coupled to the transmission case 30 by the first brake B1. The sun gear S2 is selectively coupled to the ring gear R1 via the third clutch C3. The sun gear S2 is selectively coupled to the planetary carrier CA1 via the fourth clutch C4. The sun gear S3 is selectively coupled to the ring gear R1 via the first clutch C1. The planetary carrier RCA is selectively coupled to the transmission case 30 by the second brake B2. The planetary carrier RCA is selectively coupled to the input shaft 3a via the second clutch C2. The ring gear RR is coupled to the output shaft 3b, and rotates integrally with the output shaft 3b.

Each of the first to fourth clutches C1 to C4, the first brake B1 and the second brake B2 is a frictional engagement element that is frictionally engaged by a hydraulic actuator, and is controlled by the hydraulic pressure control device 4 and the ECU 5. These first to fourth clutches C1 to C4, the first brake B1 and the second brake B2 are an example of frictional engagement elements, each of which is selectively engaged or released through hydraulic pressure control.

FIG. 3 is an operation chart that shows the engaged state or released state of each of the first to fourth clutches C1 to C4, first brake B1 and second brake B2 in each speed position (gear position). In the operation chart of FIG. 3, the circle mark indicates "engaged state, and the blank indicates "released state".

As shown in FIG. 3, in the automatic transmission 3 of this example, when the first clutch C1 and the second brake B2 are engaged, a first speed position (1st) is established. In the first speed position, a speed ratio (Rotation speed $\omega i$ of the input shaft 3a/Rotation speed $\omega oo$ of the output shaft 3b) is the largest. When the first clutch C1 and the first brake B1 are engaged, a second speed position (2nd) is established.

When the first clutch C1 and the third clutch C3 are engaged, a third speed position (3rd) is established. When the first clutch C1 and the fourth clutch C4 are engaged, a fourth speed position (4th) is established. When the first clutch C1 and the second clutch C2 are engaged, a fifth speed position (5th) is established. When the second clutch C2 and the fourth clutch C4 are engaged, a sixth speed position (6th) is established. When the second clutch C2 and the third clutch C3 are engaged, a seventh speed position (7th) is established. When the second clutch C2 and the first brake B1 are engaged, an eighth speed position (8th) is established. When the third clutch C3 and the second brake B2 are engaged, a reverse position (Rev) is established.

The hydraulic pressure control device 4 is provided in order to control the status of (whether to engage or release) each of the frictional engagement elements of the automatic transmission 3. The hydraulic pressure control device 4 also has the function of controlling the lockup clutch 24 of the torque converter 2.

Figure 4:
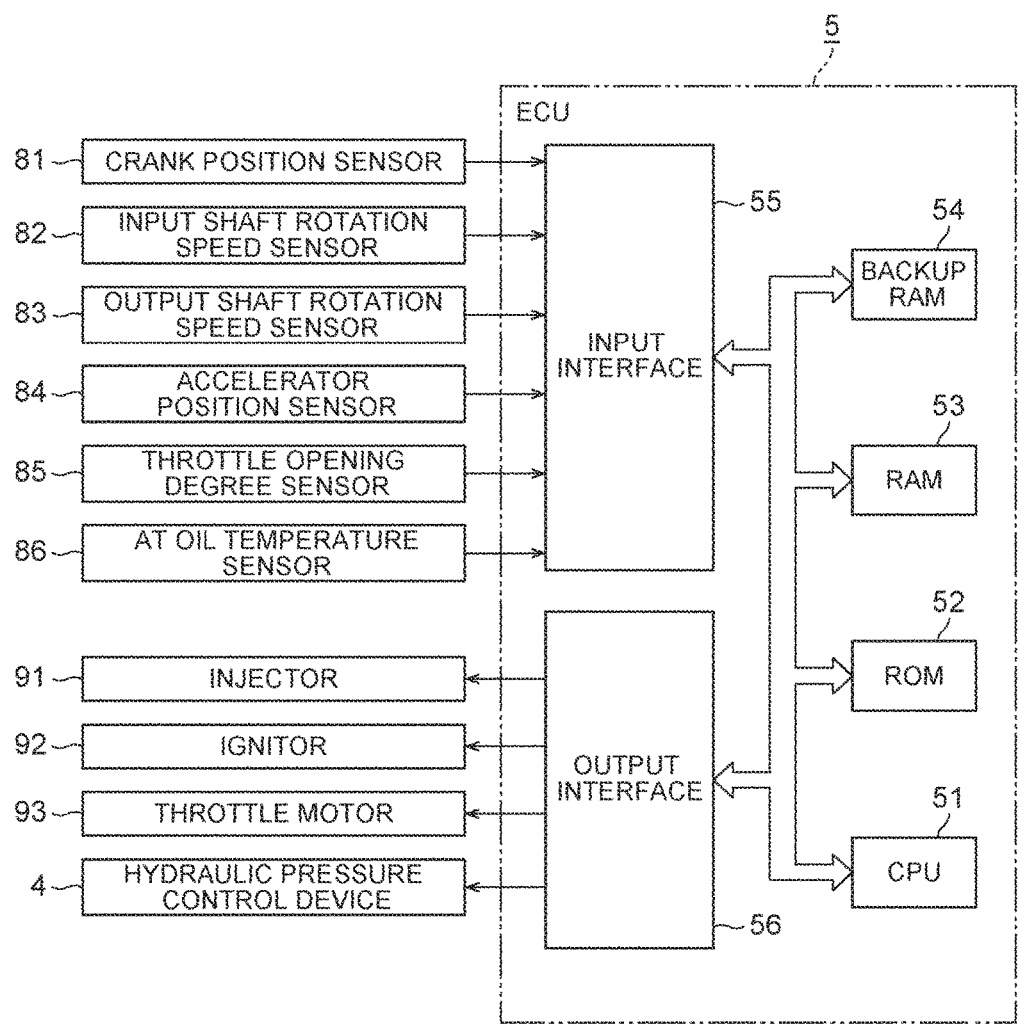
FIG. 4 is a block diagram that shows the configuration of a control system of the vehicle.

The ECU 5 is configured to control the operation of the engine 1, the shift of the automatic transmission 3, and the like. Specifically, as shown in FIG. 4, the ECU 5 includes a CPU 51, a ROM 52, a RAM 53, a backup RAM 54, an input interface 55 and an output interface 56.

The CPU 51 executes arithmetic processing on the basis of various control programs and maps stored in the ROM 52. The ROM 52 stores various control programs, maps, and the like. The maps are referenced when those various control programs are executed. The RAM 53 is a memory that temporarily stores computed results of the CPU 51, detected results of sensors, and the like. The backup RAM 54 is a nonvolatile memory that stores data, and the like, to be saved at the time when the ignition is turned off.

A crank position sensor 81, an input shaft rotation speed sensor 82, an output shaft rotation speed sensor 83, an accelerator position sensor 84, a throttle opening degree sensor 85, an AT oil temperature sensor 86, and the like, are connected to the input interface 55.

The crank position sensor 81 is provided in order to calculate the rotation speed Ne of the engine 1. The input shaft rotation speed sensor 82 is provided in order to calculate the rotation speed of the input shaft 3a (input shaft rotation speed ωi) (=turbine rotation speed ωt) of the automatic transmission 3. The output shaft rotation speed sensor 83 is provided in order to calculate the rotation speed of the output shaft 3b (output shaft rotation speed ωo) of the automatic transmission 3. It is possible to calculate a vehicle speed V on the basis of the rotation speed of the output shaft 3b. The accelerator position sensor 84 is provided in order to detect an accelerator operation amount Acc that is the depression amount (operation amount) of an accelerator pedal. The throttle opening degree sensor 85 is provided in order to detect the throttle opening degree of the throttle valve. The AT oil temperature sensor 86 is provided in order to detect the temperature of hydraulic oil in the hydraulic pressure control device 4.

An injector 91, an ignitor 92, a throttle motor 93, the hydraulic pressure control device 4, and the like, are connected to the output interface 56. The injector 91 is a fuel injection valve, and is able to regulate the fuel injection amount. The ignitor 92 is provided in order to regulate the ignition timing of an ignition plug. The throttle motor 93 is provided in order to regulate the throttle opening degree of the throttle valve.

The ECU 5 is configured to be able to control the operation status of the engine 1 by controlling the throttle opening degree, the fuel injection amount, the ignition timing, and the like, on the basis of detected results of the sensors, and the like. The ECU 5 is configured to be able to control the shift of the automatic transmission 3 and control the lockup clutch 24 of the torque converter 2 by controlling the hydraulic pressure control device 4.

In the shift control by the ECU 5, for example, a target speed position is set on the basis of a shift map (not shown) that uses a vehicle speed V and an accelerator operation amount Acc as parameters, and the hydraulic pressure control device 4 is controlled such that the current speed position becomes the target speed position.

In the present embodiment, at the time of a power-on downshift, the ECU 5 executes control (hereinafter, also referred to as power-on downshift control) over the engagement hydraulic pressures of the engaging and releasing engagement elements in accordance with a preset target output shaft torque. The details of the power-on downshift control will be described later.

Before the power-on downshift control that is executed in the present embodiment is described, the outline of shift control for determining controlled operation amounts that achieve shift target values in the above-described automatic transmission 3 will be described.

As for a general shift control, there is, for example, a technique for determining the torque capacity (or hydraulic pressure command value) of each of the frictional engagement elements during shifting on the basis of a predetermined control map through adaptation while evaluating whether a shift shock, a shift time, and the like, are appropriate in an actual vehicle and then performing a shift. With this technique that uses the control map, a large number of control maps need to be prepared in accordance with a shift pattern, such as a power-on downshift and a power-off upshift, and a combination of a speed position before shifting and a speed position after shifting. For this reason, as the number of speeds of an automatic transmission is increased, much effort is required for adaptation work.

Therefore, the present embodiment employs a technique for performing a shift with the use of a shift model that determines controlled operation amounts for achieving shift target values as shift control instead of the technique that uses the control map. The shift target values are target values of factors (such as a shift time and a driving force) that determine an intended mode of change during shifting. The controlled operation amounts are required values of factors (such as an engine torque and a clutch torque) that are operated for controlled objects.

Hereinafter, shift control that uses a shift model will be described. The equation of motion during shifting is expressed by the following mathematical expressions (1) and (2).

$$d\omega t/dt = a1 \cdot Tt + b1 \cdot tcapl + c1 \cdot Tcdrn + d1 \cdot d\omega o/dt \tag{1}$$

$$To = a2 \cdot Tt + b2 \cdot Tcapl + c2 \cdot Tcdrn + d2 \cdot d\omega o/dt \tag{2}$$

These mathematical expressions (1) and (2) are derived from the equation of motion of each of mutually coupled rotating elements that constitute the automatic transmission 3 and a relational expression in each of the planetary gears that constitute the automatic transmission 3. The equation of motion of each of the rotating elements is such an equation of motion that a torque that is expressed by a product of an inertia in each of the rotating elements and a time rate of change in rotation speed is defined as a torque that acts on a member associated with each of the rotating elements among the three members of each of the planetary gears and members at both sides of each of the frictional engagement elements. The relational expression in each of the planetary gears is such a relational expression that a relation in torque among the three members of each of the planetary gears and a relation in the time rate of change in rotation speed each are defined by using the gear ratio of a corresponding one of the planetary gears.

In the mathematical expressions (1) and (2), $d\omega t/dt$ is a time derivative, that is, time rate of change, of a turbine rotation speed $\omega t$ (that is, the input shaft rotation speed $\omega i$ of the automatic transmission 3), and denotes the angular acceleration (hereinafter, referred to as input shaft angular acceleration) of the input shaft 3a as the amount of change in the speed of the input shaft 3a-side rotating member. $d\omega o/dt$ is a time rate of change in the output shaft rotation speed $\omega o$ of the automatic transmission 3, and denotes an output shaft angular acceleration. Tt denotes a turbine torque that is the torque of the input shaft 3a, that is, an input shaft torque Ti of the automatic transmission 3, as the torque of the input shaft 3a-side rotating member. When a torque ratio t of the torque converter 2 is considered, the turbine torque Tt is synonymous with an engine torque Te (=Tt/t). To denotes an output shaft torque that is the torque of the output shaft 3b as the torque of an output shaft 3b-side rotating member. Tcapl is the torque capacity (hereinafter, referred to as engaging clutch torque) of the frictional engagement element that performs engaging operation during shifting. Tcdrn is the torque capacity (hereinafter, referred to as releasing clutch torque) of the frictional engagement element that performs releasing operation during shifting. a1, a2, b1, b2, c1, c2, d1, d2 each are a constant at the time when the mathematical expressions (1) and (2) are derived, and are coefficients that are determined by design on the basis of an inertia in each of the rotating elements and the gear ratio of each of the planetary gears. Specific numeric values of these constants depend on, for example, each of types of shift (for example, a shift pattern and a combination of a speed position before shifting and a shift positon after shifting). Therefore, although the equation of motion is one predetermined equation of motion, the equation of motion corresponding to each of the types of shift, in which constants vary depending on each of the types of shift, is used to shift the automatic transmission 3.

The mathematical expressions (1) and (2) are the equation of motion of the gear train of the automatic transmission 3, and formulate the relation between shift target values and controlled operation amounts. Shift target values are allowed to represent a target value of a shift time and a target value of a driving force, and are allowed to be used in the equation of motion of the gear train. In the present embodiment, the input shaft angular acceleration $d\omega t/dt$ is used as an example of a physical quantity that represents a shift time. In addition, the output shaft torque To is used as an example of a physical quantity that represents a driving force. That is, in the present embodiment, two values, that is, the input shaft angular acceleration $d\omega t/dt$ and the output shaft torque To, are set as the shift target values.

On the other hand, in the present embodiment, three values, that is, the turbine torque Tt (which is synonymous with the engine torque Te), the engaging clutch torque Tcapl and the releasing clutch torque Tcdrn, are set as the controlled operation amounts for establishing the shift target values. Since there are three controlled operation amounts for the fact that the equation of motion is composed of two mathematical expressions, that is, the mathematical expressions (1) and (2), it is not possible to uniquely determine the controlled operation amounts for achieving the two shift target values. The output shaft angular acceleration $d\omega o/dt$ in each of the mathematical expressions is calculated on the basis of the output shaft rotation speed $\omega o$ that is a detected value of the output shaft rotation speed sensor 83.

Further consideration was made to uniquely determine the controlled operation amounts by adding a constraint to the equation of motion composed of the mathematical expressions (1) and (2). In the present embodiment, torque shares of transmission torque shared between a releasing clutch and an engaging clutch are used as a constraint that is suitable for representing and controlling an exchange of torque during shifting and that is compatible with any shift pattern. That is, the torque shares of transmission torque are set as a constraint. The torque shares of transmission torque allow an exchange of torque during shifting to be incorporated into the equation of motion, and allow the controlled operation amounts to be uniquely determined. The torque shares are the proportions of transmission torque shared between the releasing clutch and the engaging clutch during shifting of the automatic transmission 3 with respect to the torque of the input shaft 3a (input shaft total transmission torque) when the total of transmission torque (total transmission torque) that needs to be shared between both the frictional engagement elements is converted to the input shaft total transmission torque. In the present embodiment, where the torque share of the engaging clutch is denoted by xapl and the torque share of the releasing clutch is denoted by xdrn, the torque shares are respectively defined by the following mathematical expressions (3) and (4) by using a torque share x (for example, $0 \leq x \leq 1$) that varies in time sequence so as to reflect an exchange of torque during shifting.

$$xapl = x \quad (3)$$

$$xdrn = 1 - x \quad (4)$$

The relational expression between the engaging clutch torque Tcapl and the releasing clutch torque Tcdrn may be defined by using "x" (=xapl) and "1−x" (=xdrn) on the basis of Tcapl and Tcdrn, which are converted as torques of the input shaft 3a, and the mathematical expressions (3) and (4). From the mathematical expressions (1) and (2) and the relational expression between Tcapl and Tcdrn, relational expressions for calculating the turbine torque Tt, the engaging clutch torque Tcapl and the releasing clutch torque Tcdrn that are the controlled operation amounts are derived. The turbine torque Tt (which is synonymous with the engine torque Te) is expressed by a relational expression that uses "x" (=xapl), "1−x" (=xdrn), the input shaft angular acceleration $d\omega t/dt$, the output shaft torque To, and the like. Similarly, the engaging clutch torque Tcapl is expressed by a relational expression that uses "x" (=xapl), the input shaft angular acceleration $d\omega t/dt$, the output shaft torque To, and the like. Similarly, the releasing clutch torque Tcdrn is expressed by a relational expression that uses "1−x" (=xdrn), the input shaft angular acceleration $d\omega t/dt$, the output shaft torque To, and the like.

That is, the shift model according to the present embodiment is to calculate the controlled operation amounts on the basis of the shift target values by using the equation of motion (the above-described mathematical expressions (1) and (2)) of the automatic transmission 3, including the shift target values and the controlled operation amounts, and the relations (the above-described mathematical expressions (3) and (4)) that respectively express the torque shares. In this way, in the present embodiment, by adding the constraint set by the torque share x to the mathematical expressions (1) and (2), the shift of the automatic transmission 3 is performed with the use of the shift model. Thus, even when there are three controlled operation amounts for two shift target values, it is possible to appropriately determine the three controlled operation amounts with the use of the shift model. The shift model is a predetermined one, and the equation of motion of the gear train having different constants for each of the types of shift (for example, a shift pattern and a combination of a speed position before shifting and a speed position after shifting) as described above is used, so the shift model corresponding to each of the types of shift is used to shift the automatic transmission 3.

As described above, in the present embodiment, at the time of a power-on downshift, the engagement hydraulic pressures of the engaging and releasing engagement elements are controlled in accordance with a preset target output shaft torque. Specifically, the ECU 5 is configured to, at the time of a power-on downshift, calculate a target output shaft torque Tto that is a target value of the torque of the output shaft 3b of the automatic transmission 3 and control the engagement hydraulic pressure of the engaging engagement element (engaging clutch) and the engagement hydraulic pressure of the releasing engagement element (releasing clutch) on the basis of the controlled operation amounts that are determined through the equation of motion of the above-described mathematical expressions (1) and (2) on the basis of the target output shaft torque Tto.

More specifically, the ECU 5 calculates a current vehicle speed V on the basis of an output signal of the output shaft rotation speed sensor 83, and calculates an accelerator operation amount Acc that is the depression amount of the accelerator pedal on the basis of an output signal of the accelerator position sensor 84. The ECU 5 calculates a target speed position by consulting the shift map on the basis of these vehicle speed V and accelerator operation amount Acc. In addition, the ECU 5 estimates a current speed position on the basis of output signals of the input shaft rotation speed sensor 82 and output shaft rotation speed sensor 83, compares the current speed position with the target speed position, and determines whether the shift is an upshift or a downshift. For example, the ECU 5 determines that the shift is a downshift when the current speed position of the automatic transmission 3 is the third speed position and the target speed position is the second speed position.

Subsequently, the ECU 5, for example, determines whether the shift is in a power-on state or a power-off state by consulting a determination map (not shown) that is set in accordance with the vehicle speed V and the accelerator operation amount Acc, and determines whether the shift is in a power-on state or a power-off state by consulting a determination map (not shown) that is set in accordance with the input shaft rotation speed ωi and input shaft torque Ti of the automatic transmission 3. Thus, the ECU 5 determines whether the current shift is a power-on downshift.

The ECU 5 calculates the rotation speed of the input shaft 3a at the time when the input shaft rotation speed ωi and the output shaft rotation speed ωo are synchronized with each other (hereinafter, also referred to as input shaft rotation speed ωsi after shifting) by multiplying the speed ratio (gear ratio) of the speed position after shifting by the output shaft rotation speed ωo that is obtained from the output signal of the output shaft rotation speed sensor 83. The ECU 5 continues to calculate and monitor the differential rotation speed between the input shaft rotation speed ωsi after shifting and the current input shaft rotation speed ωi from the start of a shift to the end of the shift.

The ECU 5, for example, calculates a target output shaft torque Tto on the basis of a required driving force and an elapsed time from the start of shift control by consulting an output shaft torque change map (not shown) in which the mode of changing the output shaft torque To is determined in advance for each type of a shift (shift pattern or a combination of gear positions). The ECU 5 calculates a turbine rotation speed ωt on the basis of an output signal of the input shaft rotation speed sensor 82, and calculates an input shaft angular acceleration dωt/dt by obtaining a time derivative of the turbine rotation speed ωt. In this way, as described above, the ECU 5 calculates a turbine torque Tt, an engaging clutch torque Tcapl and a releasing clutch torque Tcdrn by using the mathematical expressions (1) and (2) on the basis of the input shaft angular acceleration dωt/dt and the target output shaft torque Tto (which is synonymous with the output shaft torque To). The ECU 5 controls the command hydraulic pressure of the engaging and releasing engagement elements in power-on downshift on the basis of these engaging clutch torque Tcapl and releasing clutch torque Tcdrn.

Figure 8:
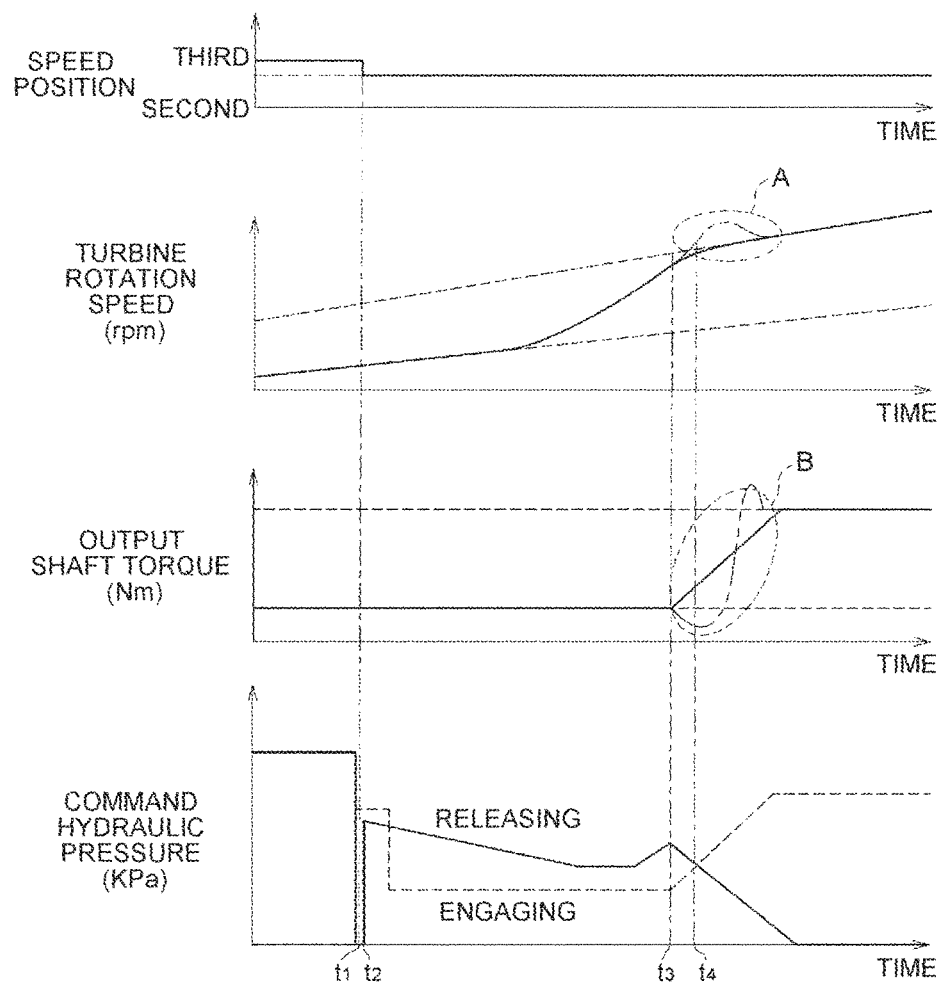
FIG. 8 is an example of a timing chart in the case where the releasing command hydraulic pressure delay control is not executed.

FIG. 8 is a timing chart in the case where releasing command hydraulic pressure delay control (described later) is not executed. As shown in FIG. 8, when it is determined that the shift is a power-on downshift on the basis of, for example, depression of the accelerator pedal while traveling in the third speed position, shift control is started at time $t_1$ in FIG. 8, at which a predetermined time has elapsed from when the depression of the accelerator pedal is detected. As the shift control is started, in order to control the input shaft rotation speed ωi during shifting with the use of the engagement hydraulic pressure of the third clutch C3 that is the releasing engagement element in a third-to-second downshift, the command hydraulic pressure (continuous line) of the third clutch C3 is slowly decreased at time $t_2$ in FIG. 8, and the input shaft rotation speed ωi (=turbine rotation speed ωt) increases accordingly.

At time $t_3$ in FIG. 8, when the differential rotation speed between the input shaft rotation speed ωsi after shifting and the current input shaft rotation speed ωi falls within a predetermined range, it is determined to end the inertia phase and start the torque phase. Then, a reduction in the command hydraulic pressure of the third clutch C3 that is the releasing engagement element is started and an increase in the command hydraulic pressure (dashed line) of the first brake B1 that is the engaging engagement element is started in accordance with the target output shaft torque Tto. Accordingly, as indicated by the continuous line inside the dashed-line ellipse B in FIG. 8, the output shaft torque To increases as intended.

However, when the first brake B1 does not begin to be engaged in accordance with the command hydraulic pressure due to the influence of a delay in the response of actual pressure in the first brake B1 to the command hydraulic pressure or a machine difference of the first brake B 1, the turbine rotation speed ωt can race at time $t_4$ in FIG. 8 (see the alternate long and two-short dashes line inside the dashed-line ellipse A in FIG. 8) since the command hydraulic pressure of the third clutch C3 is decreased.

If such overspeed of the turbine rotation speed ωt (hereinafter, also referred to as turbine overspeed) occurs, the output shaft torque To once drops due to a decrease in the hydraulic pressure of the third clutch C3 that is the releasing engagement element as indicated by the alternate long and two-short dashes line inside the dashed-line ellipse B in FIG. 8, and then the turbine rotation speed ωt is decreased by the first brake B1 that is the engaging engagement element, with the result that an inertia shock can occur. In order to suppress turbine overspeed while suppressing occurrence of such an inertia shock, the third clutch C3 needs to take charge of the amount of inertia that decreases the turbine rotation speed ωt. Therefore, it is conceivable to increase the engagement hydraulic pressure of the third clutch C3.

An increase in the engagement hydraulic pressure of the third clutch C3 is effective in reducing turbine overspeed; however, the third clutch C3 has an excessive torque capacity. Therefore, there is an inconvenience that a shock due to tie-up increases as the actual response of the engagement hydraulic pressure of the first brake B1 catches up and engaging force increases or an inconvenience that the durability of the third clutch C3 decreases due to an increase in friction material load.

In power-on downshift control according to the present embodiment, in consideration of the influence of a delay in the response of the engaging engagement element and a machine difference of the engaging engagement element, releasing command hydraulic pressure delay control for delaying the start of decrease in the engagement hydraulic pressure of the releasing engagement element from the start of the torque phase is executed. Specifically, the ECU 5 is configured to delay the start of decrease in the engagement hydraulic pressure of the releasing engagement element from the start of the torque phase while keeping the engagement hydraulic pressure of the releasing engagement element at the start of the torque phase, and, when overspeed of the input shaft rotation speed ωi (=turbine rotation speed ωt) is occurring in the torque phase, start a decrease in the engagement hydraulic pressure of the releasing engagement element when a delay time exceeds an upper limit delay time Tmax or when the overspeed of the input shaft rotation speed ωi has converged within the upper limit delay time Tmax.

The upper limit delay time Tmax is a value determined in advance in accordance with a shift condition, and is, for example, set to a value within which the friction material load of the releasing engagement element is allowed when a delay time from the start of the torque phase is shorter than or equal to the upper limit delay time Tmax.

Initially, the ECU 5 determines to start the torque phase (end the inertia phase) when the differential rotation speed between the input shaft rotation speed ωsi after shifting and the current input shaft rotation speed ωi falls within the predetermined range in power-on downshift. Since it is not clear at the start of the torque phase whether overspeed of the input shaft rotation speed ωi (=turbine rotation speed ωt) occurs due to the influence of a delay in the response of the engaging engagement element or a machine difference of the engaging engagement element, the ECU 5 maintains the command hydraulic pressure of the releasing engagement element at the start of the torque phase irrespective of whether there will be overspeed of the input shaft rotation speed ωi. Thus, since the start of decrease in the engagement hydraulic pressure of the releasing engagement element delays from the start of the torque phase while the engagement hydraulic pressure of the releasing engagement element at the start of the torque phase is maintained, it is possible to make it difficult for turbine overspeed to occur. In addition, since the releasing engagement element does not have an excessive torque capacity, it is possible to suppress an increase in shock due to tie-up.

The ECU 5 determines whether overspeed of the input shaft rotation speed ωi is occurring in the torque phase on the basis of the differential rotation speed between the input shaft rotation speed ωsi after shifting and the current input shaft rotation speed ωi. When overspeed of the input shaft rotation speed ωi is occurring, the ECU 5 determines whether the overspeed of the input shaft rotation speed ωi has converged on the basis of the differential rotation speed between the input shaft rotation speed ωsi after shifting and the current input shaft rotation speed ωi while the command hydraulic pressure of the releasing engagement element at the start of the torque phase is maintained. That is, the ECU 5 determines that the overspeed of the input shaft rotation speed ωi is occurring when the differential rotation speed is greater than or equal to a first predetermined value and the ECU 5 determines that the overspeed of the input shaft rotation speed ωi has converged when the differential rotation speed is less than or equal to a second predetermined value. The first predetermined value is greater than the second predetermined value.

When it is determined that the overspeed of the input shaft rotation speed ωi has converged within the upper limit delay time Tmax, the ECU 5 decreases the engagement hydraulic pressure of the releasing engagement element in accordance with the initial target output shaft torque Tto, that is, at the gradient according to the target output shaft torque Tto. Thus, it is possible to increase the output shaft torque To as intended while reliably suppressing overspeed of the input shaft rotation speed ωi, that is, the turbine rotation speed ωt.

On the other hand, even before the overspeed converges, the ECU 5 decreases the engagement hydraulic pressure of the releasing engagement element at the gradient according to the initial target output shaft torque Tto when the delay time exceeds the upper limit delay time Tmax. With this configuration, it is possible to prevent, for example, clutch burning, or the like, by suppressing an increase in the friction material load of the releasing engagement element. Thus, it is possible to suppress a decrease in the durability of the releasing engagement element.

When overspeed of the input shaft rotation speed ωi is not occurring in the torque phase as well, if the start of decrease in the engagement hydraulic pressure of the releasing engagement element is delayed until the delay time exceeds the upper limit delay time Tmax, the progress of the shift stagnates. Therefore, the ECU 5 is configured to, when overspeed of the input shaft rotation speed ωi is not occurring in the torque phase, start a decrease in the engagement hydraulic pressure of the releasing engagement element at the gradient according to the initial target output shaft torque Tto when the delay time becomes longer than or equal to a minimum delay time Tmin. The minimum delay time Tmin is set so as to be shorter than the upper limit delay time Tmax. Thus, since the start of decrease in the engagement hydraulic pressure of the releasing engagement element is delayed until the minimum delay time Tmin elapses while stagnation of the progress of the shift is suppressed, it is possible to, for example, prevent overspeed of the input shaft rotation speed ωi due to the influence of a delay in the response of the engagement hydraulic pressure of the engaging engagement element or a machine difference of the engaging engagement element.

The minimum delay time Tmin is a value that is set on the basis of the allotted torque of the engaging engagement element and the temperature of hydraulic oil in the automatic transmission 3 (inside the hydraulic pressure control device 4). The allotted torque of the engaging engagement element is calculated on the basis of the torque share xapl, while the oil temperature is calculated on the basis of an output signal of the AT oil temperature sensor 86. In this way, it is possible to appropriately set the minimum delay time Tmin by using the allotted torque and oil temperature, which significantly influence a delay in the response of the engagement hydraulic pressure of the engaging engagement element, as parameters. Thus, it is possible to further reliably suppress overspeed of the input shaft rotation speed ωi while suppressing stagnation of the progress of the shift.

Figure 5:
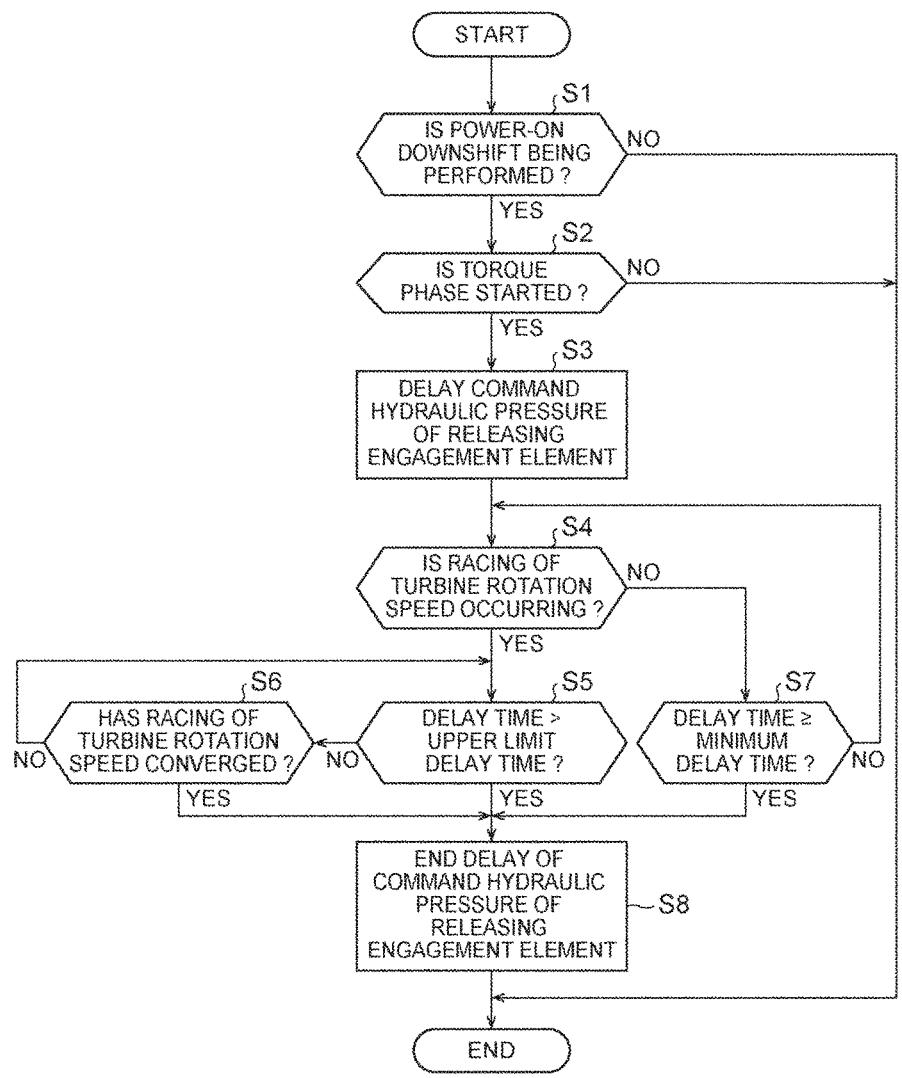
FIG. 5 is a flowchart for illustrating the procedure of releasing command hydraulic pressure delay control.

Next, the procedure of the releasing command hydraulic pressure delay control according to the present embodiment will be described with reference to the flowchart of FIG. 5.

Initially, in step S1, the ECU 5 determines whether a power-on downshift is being performed. Specifically, the ECU 5 determines whether the power-on downshift is being performed by consulting the shift map, the determination map, and the like, on the basis of the current vehicle speed V, the current accelerator operation amount Acc and the current input shaft torque Ti. When negative determination is made in step S1, it is not a situation in which the aspects of the disclosure are applied, so the process directly ends. On the other hand, when affirmative determination is made in step S1, the process proceeds to step S2.

In the next step S2, the ECU 5 determines whether it is a situation in which the torque phase is started on the basis of the differential rotation speed between the input shaft rotation speed ωsi after shifting and the current input shaft rotation speed ωi. When negative determination is made in step S2, it is not a situation in which the aspects of the disclosure are applied, so the process directly ends. On the other hand, when affirmative determination is made in step S2, the process proceeds to step S3.

In the next step S3, the ECU 5 delays the start of decrease in the engagement hydraulic pressure of the releasing engagement element from the start of the torque phase by delaying the command hydraulic pressure of the releasing engagement element while maintaining the engagement hydraulic pressure of the releasing engagement element at the start of the torque phase, and then proceeds to step S4.

In the next step S4, the ECU 5 determines whether overspeed of the turbine rotation speed ωt (=input shaft rotation speed ωi) is occurring on the basis of the differential rotation speed between the input shaft rotation speed ωsi after shifting and the current input shaft rotation speed ωi. When affirmative determination is made in step S4, in other words, when turbine overspeed is occurring, the process proceeds to step S5 while a delay of the command hydraulic pressure of the releasing engagement element is maintained.

In the next step S5, the ECU 5 determines whether a delay time from the start of the torque phase exceeds the upper limit delay time Tmax with the use of, for example, a timer, or the like. When affirmative determination is made in step S5, the process proceeds to step S8. In step S8, a delay of the command hydraulic pressure of the releasing engagement element is ended, the engagement hydraulic pressure of the releasing engagement element is decreased at the gradient according to the initial target output shaft torque Tto, and then the process ends. On the other hand, when negative determination is made in step S5, in other words, when a delay time from the start of the torque phase is shorter than or equal to the upper limit delay time Tmax, the process proceeds to step S6.

In the next step S6, the ECU 5 determines whether the overspeed of the turbine rotation speed ωt has converged on the basis of the differential rotation speed between the input shaft rotation speed ωsi after shifting and the current input shaft rotation speed ωi. When affirmative determination is made in step S6, the process proceeds to step S8. In step S8, a delay of the command hydraulic pressure of the releasing engagement element is ended, the engagement hydraulic pressure of the releasing engagement element is decreased at the gradient according to the initial target output shaft torque Tto, and then the process ends. On the other hand, when negative determination is made in step S6, the process returns to step S5 again. When a delay time from the start of the torque phase exceeds the upper limit delay time Tmax (YES in step S5) or when the overspeed of the turbine rotation speed ωt has converged (YES in step S6), the process proceeds to step S8. In step S8, a delay of the command hydraulic pressure of the releasing engagement element is ended, and then the process ends.

In contrast, when negative determination is made in step S4, in other words, when turbine overspeed is not occurring, the process proceeds to step S7 while a delay of the command hydraulic pressure of the releasing engagement element is maintained. In step S7, the ECU 5 determines whether a delay time from the start of the torque phase becomes longer than or equal to the minimum delay time Tmin with the use of, for example, a timer, or the like. When affirmative determination is made in step S7, the process proceeds to step S8. In step S8, a delay of the command hydraulic pressure of the releasing engagement element is ended, the engagement hydraulic pressure of the releasing engagement element is decreased at the gradient according to the initial target output shaft torque Tto, and then the process ends. On the other hand, when negative determination is made in step S7, the process returns to step S4 again. In step S4, it is determined whether turbine overspeed is occurring. After that, when a delay time from the start of the torque phase exceeds the upper limit delay time Tmax (YES in step S5) or when the overspeed of the turbine rotation speed ωt has converged (YES in step S6) or when a delay time from the start of the torque phase becomes longer than or equal to the minimum delay time Tmin (YES in step S7), the process proceeds to step S8. In step S8, a delay of the command hydraulic pressure of the releasing engagement element is ended, and then the process ends.

Next, a first control example of the releasing command hydraulic pressure delay control according to the present embodiment will be described with reference to the timing chart of FIG. 6. The command hydraulic pressure of the first brake B1 that is the engaging engagement element and the command hydraulic pressure of the third clutch C3 that is the releasing engagement element are controlled on the basis of the controlled operation amounts that are determined by the equation of motion of the above-described mathematical expressions (1) and (2).

Figure 6:
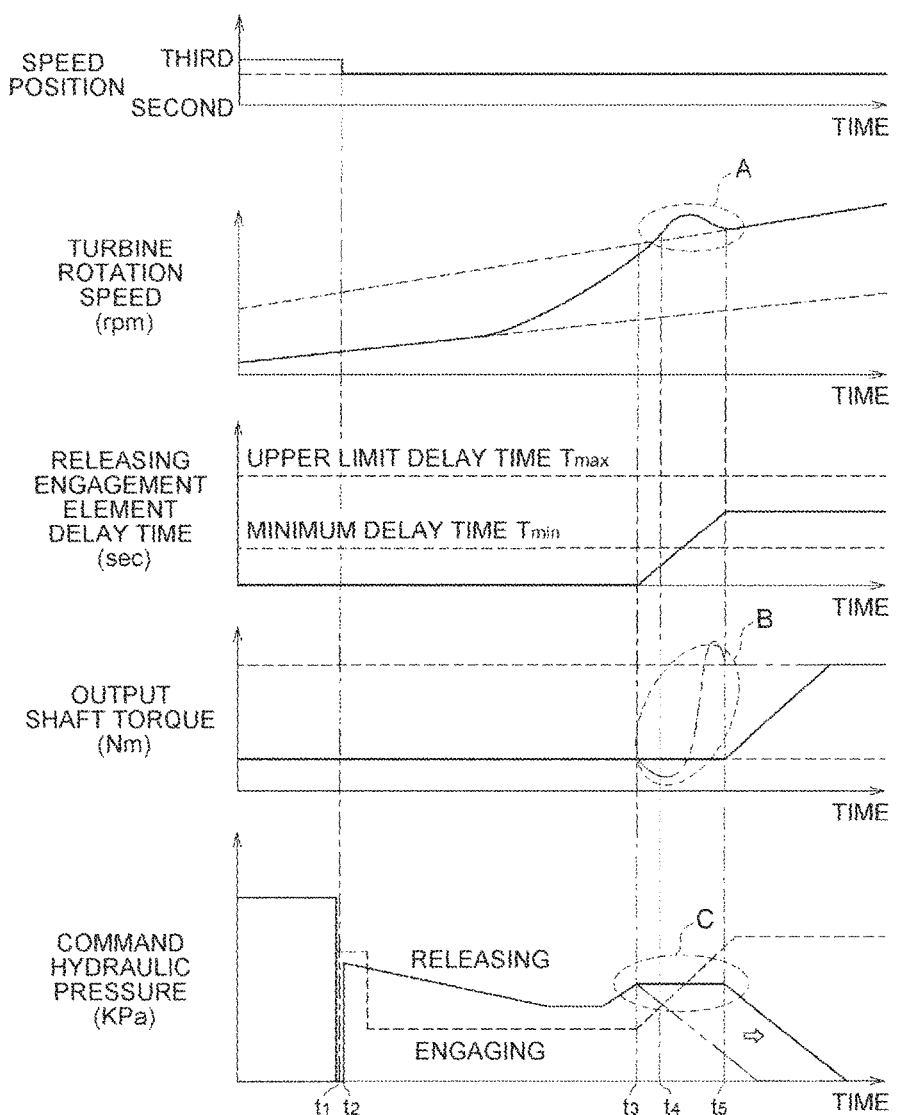
FIG. 6 is an example of a timing chart in the case where the releasing command hydraulic pressure delay control is executed.

As shown in FIG. 6, when it is determined to perform a power-on downshift on the basis of, for example, depression of the accelerator pedal, while traveling in the third speed position, shift control is started at time $t_1$ in FIG. 6, at which a predetermined time has elapsed from when depression of the accelerator pedal is detected. As the shift control is started, in order to control the input shaft rotation speed ωi during shifting with the use of the engagement hydraulic pressure of the third clutch C3 that is the releasing engagement element in a third-to-second downshift, the command hydraulic pressure (continuous line) of the third clutch C3 is slowly decreased at time $t_2$ in FIG. 6, and the input shaft rotation speed ωi (=turbine rotation speed ωt) increases accordingly.

At time $t_3$ in FIG. 6, when the differential rotation speed between the input shaft rotation speed ωsi after shifting and the current input shaft rotation speed ωi falls within the predetermined range, it is determined to start the torque phase, and an increase in the command hydraulic pressure (dashed line) of the first brake B1 is started in accordance with the target output shaft torque Tto. In contrast, the command hydraulic pressure at the start of the torque phase is maintained in the third clutch C3, the start of decrease in the command hydraulic pressure of the releasing engagement element is delayed from the command hydraulic pressure indicated by the alternate long and two-short dashes line as indicated by the outline arrow in FIG. 6.

At time $t_4$ in FIG. 6, since the command hydraulic pressure at the start of the torque phase is maintained as indicated by the dashed-line ellipse C in FIG. 6 even when overspeed of the turbine rotation speed ωt occurs as indicated by the dashed-line ellipse A in FIG. 6, a drop of the output shaft torque To as indicated by the alternate long and two-short dashes line inside the dashed-line ellipse B in FIG. 6 and occurrence of an inertia shock are suppressed.

At time $t_5$ in FIG. 6, when the overspeed of the turbine rotation speed ωt has converged, a delay of the command hydraulic pressure of the third clutch C3 is ended, and the command hydraulic pressure of the third clutch C3 is decreased at the gradient according to the initial target output shaft torque Tto. Accordingly, the output shaft torque To increases as intended.

Next, a second control example of the releasing command hydraulic pressure delay control according to the present embodiment will be described with reference to the timing chart of FIG. 7. The command hydraulic pressure of the first brake B1 that is the engaging engagement element and the command hydraulic pressure of the third clutch C3 that is the releasing engagement element are controlled on the basis of the controlled operation amounts that are determined by the equation of motion composed of the above-described mathematical expressions (1) and (2).

Figure 7:
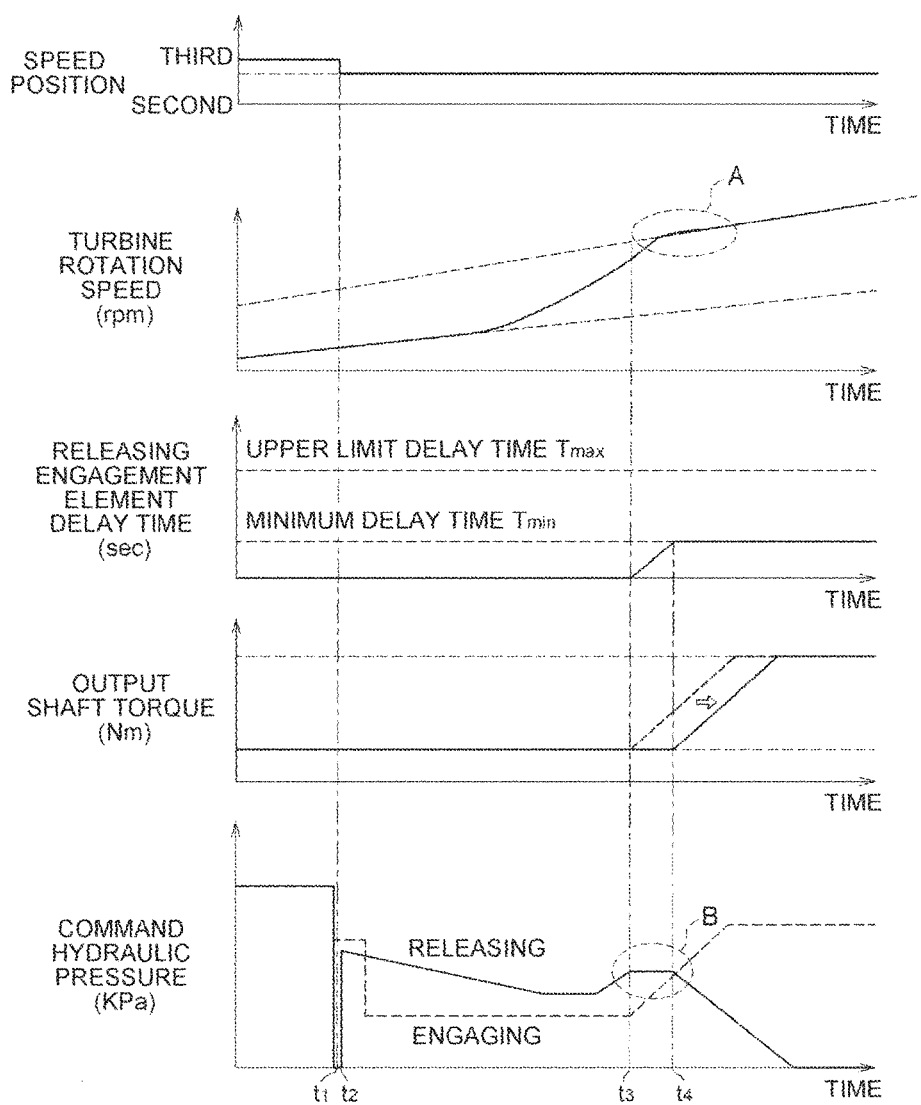
FIG. 7 is an example of a timing chart in the case where the releasing command hydraulic pressure delay control is executed.

As shown in FIG. 7, when it is determined to perform a power-on downshift on the basis of, for example, depression of the accelerator pedal, while traveling in the third speed position, shift control is started at time $t_1$ in FIG. 7, at which a predetermined time has elapsed from when the depression of the accelerator pedal is detected. As the shift control is started, in order to control the input shaft rotation speed ωi during shifting with the use of the engagement hydraulic pressure of the third clutch C3, the command hydraulic pressure (continuous line) of the third clutch C3 is slowly decreased at time $t_2$ in FIG. 7, and the input shaft rotation speed ωi (=turbine rotation speed ωt) increases accordingly.

At time $t_3$ in FIG. 7, when the differential rotation speed between the input shaft rotation speed ωsi after shifting and the current input shaft rotation speed ωi falls within the predetermined range, it is determined to start the torque phase, and an increase in the command hydraulic pressure (dashed line) of the first brake B1 that is the engaging engagement element is started in accordance with the target output shaft torque Tto. In contrast, the command hydraulic pressure at the start of the torque phase is maintained in the third clutch C3, and the start of decrease in the command hydraulic pressure of the third clutch C3 is delayed from the start of the torque phase. Thus, even when overspeed of the turbine rotation speed ωt is not occurring as indicated by the dashed-line ellipse A in FIG. 7, the command hydraulic pressure at the start of the torque phase is maintained as indicated by the dashed-line ellipse B in FIG. 7, so turbine overspeed is difficult to occur.

At time $t_4$ in FIG. 7, when a delay time from the start of the torque phase reaches the minimum delay time Tmin, a delay in the command hydraulic pressure of the third clutch C3 is ended, and the command hydraulic pressure of the third clutch C3 is decreased at the gradient according to the initial target output shaft torque Tto. Accordingly, as indicated by the outline arrow in FIG. 7, the output shaft torque To increases as intended after a delay of the minimum delay time Tmin from the output shaft torque To indicated by the alternate long and two-short dashes line.

The disclosure is not limited to the above-described embodiment. The disclosure may be implemented in other various forms without departing from the spirit or main characteristic of the disclosure.

In the above-described embodiment, an example in which the vehicle 100 is an FF vehicle is described; however, the vehicle is not limited to the FF vehicle. The vehicle may be a front-engine rear-drive (FR) vehicle or a four-wheel drive vehicle.

In the above-described embodiment, the engine 1 is a gasoline engine. Instead, the engine may be a diesel engine.

The embodiment described above is illustrative and not restrictive in all respects. The scope of the disclosure encompasses all the modifications and changes within the appended claims and equivalents thereof.

According to the aspects of the disclosure, even when there occurs a delay in the response of an engaging engagement element, or the like, in power-on downshift, it is possible to suppress an increase in shock due to tie-up while suppressing turbine overspeed, and it is possible to suppress a decrease in the durability of a releasing engagement element by suppressing an increase in friction material load, so it is advantageous when applied to a control device for a vehicle, and control method for a vehicle.

What is claimed is:

1. A control device for a vehicle,
the vehicle including an engine and an automatic transmission,
   the automatic transmission including an input shaft and a plurality of engagement elements, the plurality of engagement elements including an engaging element and a disengaging element,
   the automatic transmission being configured to establish a plurality of gear positions having different speed ratios by selectively engaging and disengaging the plurality of engagement elements through hydraulic pressure control and configured to transmit power from the engine to a drive wheel side,
the control device comprising:
   an electronic control unit configured to:
      control a hydraulic pressure of the engaging element and a hydraulic pressure of the disengaging element in accordance with a preset target output shaft torque, during a power-on downshift;
      delay a start of decrease in the hydraulic pressure of the disengaging element from a start of a torque phase while maintaining the hydraulic pressure of the disengaging element at the start of the torque phase; and
      start decreasing the hydraulic pressure of the disengaging element when the electronic control unit determines that overspeed of the input shaft is occurring during the torque phase and a predetermined condition is established,
      the predetermined condition being one of a condition in which a delay time from the start of the torque phase exceeds a predetermined upper limit delay time and a condition in which the overspeed has converged within the upper limit delay time.

2. The control device according to claim 1, wherein
the electronic control unit is configured to, decrease the hydraulic pressure of the disengaging element in accordance with the target output shaft torque, when the electronic control unit determines that the predetermined condition is established.

3. The control device according to claim 1, wherein
the electronic control unit is configured to start decreasing the hydraulic pressure of the disengaging element when the electronic control unit determines that overspeed of the input shaft is not occurring in the torque phase and the delay time becomes longer than or equal to a minimum delay time, and
the minimum delay time is set so as to be shorter than the upper limit delay time.

4. The control device according to claim 3, wherein
the minimum delay time is set based on an assigned torque of the engaging element and an oil temperature of the automatic transmission.

5. A control method for a vehicle,
the vehicle including an engine, an automatic transmission, and an electronic control unit,
the automatic transmission including an input shaft and a plurality of engagement elements, the plurality of engagement elements including an engaging element and a disengaging element,
the automatic transmission being configured to establish a plurality of gear positions having different speed ratios by selectively engaging and disengaging the plurality of engagement elements through hydraulic pressure control and configured to transmit power from the engine to a drive wheel side,
the control method comprising:
controlling, by the electronic control unit, a hydraulic pressure of the engaging element and a hydraulic pressure of the disengaging element in accordance with a preset target output shaft torque during a power-on downshift;
delaying, by the electronic control unit, a start of decrease in the hydraulic pressure of the disengaging element from a start of a torque phase while maintaining the hydraulic pressure of the disengaging element at the start of the torque phase; and
starting, by the electronic control unit, decreasing the hydraulic pressure of the disengaging element when the electronic control unit determines that overspeed of the input shaft is occurring during the torque phase and a predetermined condition is established,
the predetermined condition being one of a condition in which a delay time from the start of the torque phase exceeds a predetermined upper limit delay time and a condition in which the overspeed has converged within the upper limit delay time.

* * * * *